United States Patent
Yamazaki et al.

(10) Patent No.: US 7,223,203 B2
(45) Date of Patent: May 29, 2007

(54) METHOD OF DETECTING TORQUE DISTURBANCES IN A HYBRID VEHICLE

(75) Inventors: Mark Yamazaki, Canton, MI (US); Brandon Masterson, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 10/711,202

(22) Filed: Sep. 1, 2004

(65) Prior Publication Data

US 2006/0046893 A1  Mar. 2, 2006

(51) Int. Cl.
 *B60W 10/04* (2006.01)
(52) U.S. Cl. ................... 477/15; 477/3; 477/6
(58) Field of Classification Search ............ 477/2, 477/3, 5, 6, 15; 701/22, 52, 53, 54
See application file for complete search history.

(56) References Cited

U.S. PATENT DOCUMENTS

| | | | |
|---|---|---|---|
| 4,119,862 A * | 10/1978 | Gocho | 290/17 |
| 5,754,967 A | 5/1998 | Inoue et al. | |
| 5,833,570 A | 11/1998 | Tabata et al. | |
| 6,083,138 A | 7/2000 | Aoyama et al. | |
| 6,090,007 A | 7/2000 | Nakajima et al. | |
| 6,193,628 B1 | 2/2001 | Hrovat et al. | |
| 6,226,583 B1 | 5/2001 | Iwata | |
| 6,266,597 B1 * | 7/2001 | Russell et al. | 701/54 |
| 6,364,807 B1 | 4/2002 | Koneda et al. | |
| 6,560,523 B2 | 5/2003 | Kotwicki et al. | |
| 6,574,535 B1 | 6/2003 | Morris et al. | |
| 7,101,313 B2 * | 9/2006 | Kresse et al. | 477/115 |
| 7,108,626 B2 * | 9/2006 | Friedmann | 475/8 |
| 2002/0079148 A1 | 6/2002 | Aoki et al. | |
| 2003/0001390 A1 | 1/2003 | Phillips et al. | |

\* cited by examiner

*Primary Examiner*—Ha Ho
(74) *Attorney, Agent, or Firm*—David B. Kelley; Brooks Kushman P.C.

(57) ABSTRACT

A method controlling a hybrid electric vehicle. The hybrid electric vehicle includes a power transfer unit having a plurality of gear ratios and at least one power source adapted to drive the power transfer unit. The method includes calculating a speed ratio value, comparing the speed ratio value to a threshold value, and inferring a torque disturbance if the speed ratio value is greater than the threshold value.

10 Claims, 2 Drawing Sheets

METHOD OF DETECTING TORQUE DISTURBANCES IN A HYBRID VEHICLE

BACKGROUND OF THE INVENTION

1. Field of the Invention

The present invention relates generally to the control of a hybrid electric vehicle, and more particularly to a method for detecting torque disturbances in a wheel drive system of a hybrid electric vehicle.

2. Background Art

Previously, hybrid vehicles employed control strategies that sensed a difference in rotational speed between a driven end of a wheelshaft and the wheelshaft's respective wheel to dampen wheel torque oscillations. An example of such a strategy is described in U.S. Pat. No. 6,193,628 assigned to the assignee of the present invention. In the prior art, wheel torque oscillations were dampened by commanding a torque "pulse" that counteracted a torque hole that occurred during automatic transmission upshifts. However, such strategies did not address torque disturbances such as gear backlash that may occur in a hybrid vehicle wheel drive system.

SUMMARY OF THE INVENTION

According to one aspect of the present invention, a method controlling a hybrid electric vehicle is provided. The hybrid electric vehicle includes a power transfer unit and at least one power source. The power transfer unit is adapted to drive a vehicle wheel and has a plurality of gear ratios. The power source is adapted to drive the power transfer unit.

The method includes the steps of calculating a speed ratio value based on a drivetrain output speed and a wheel speed, comparing the speed ratio value to a threshold value, and inferring a torque disturbance is the speed ratio value is greater than the threshold value. The method allows torque disturbances that may be caused by the release of torsional energy stored in one or more vehicle drivetrain components to be accurately inferred or predicted so that mitigation efforts may be undertaken.

The speed ratio value may be a function of a drivetrain output speed and an average wheel speed. The drivetrain output speed may be measured at an output shaft of the power transfer unit, the power source, or a starter-alternator.

A gear backlash mitigation strategy may be executed if the speed ratio value exceeds the threshold value. The gear backlash mitigation strategy may include applying additional torque with the starter-alternator for a predetermined period of time to reduce the duration of a zero torque condition between gears of the power transfer unit or gears of the differential. As such, negative attributes associated with gear backlashes are reduced or eliminated. More specifically, objectionable noises are reduced and vehicle acceleration responsiveness and component life is improved.

According to another aspect of the present invention, a method for inhibiting gear backlash in a drivetrain of a hybrid electric vehicle is provided. The hybrid electric vehicle includes a power transfer unit, a set of power sources, a starter-alternator, a first signal, and a second signal. The power transfer unit has a plurality of gear ratios adapted to drive a set of vehicle wheels. The starter-alternator is adapted to be powered by at least one member of the set of power sources. The first signal is indicative of a drivetrain output speed. The second signal is indicative of an average speed of the set of wheels.

The method includes the steps of calculating a speed ratio value as a function of the first and second signals sampled at a first time interval and a second time interval, determining whether the speed ratio value is greater than a threshold value, and executing a gear backlash mitigation strategy if the speed ratio value exceeds the threshold value.

The gear backlash mitigation strategy may include reducing an output torque of the starter-alternator for a predetermined period of time, decreasing power provided by at least one power source, and/or reversing a direction of torque provided by or to the power transfer unit for a predetermined period of time.

The set of power sources may include an engine having an engine output shaft. The first signal may be based on a rotational speed of the starter-alternator and may be measured at the engine output shaft or the power transfer unit.

According to another aspect of the present invention, a method for detecting a zero torque condition in a drivetrain of a hybrid electric vehicle is provided. The hybrid electric vehicle includes a power transfer unit, a set of power sources, a starter-alternator, a first signal, and a second signal. The power transfer unit is adapted to drive at least one vehicle wheel and has a plurality of gear ratios. The set of power sources includes an engine and at least one voltage source. The starter-alternator is adapted to be powered by at least one member of the set of power sources. First signal is indicative of a drivetrain output speed. The second signal is indicative of an average wheel speed.

The method includes the steps of calculating a speed ratio value indicative of a zero torque condition as a function of the first and second signals sampled at first and second time intervals, determining whether the speed ratio value is greater than a threshold value, and executing a mitigation strategy to reduce the duration of the zero torque condition if the speed ratio value exceeds the threshold value.

The hybrid electric vehicle may include a differential coupled to the power transfer unit and a shaft coupled to the vehicle wheel. The speed ratio value may be indicative of the release of potential energy stored in the shaft.

DETAILED DESCRIPTION OF THE PREFERRED EMBODIMENT(S)

Figure 1:
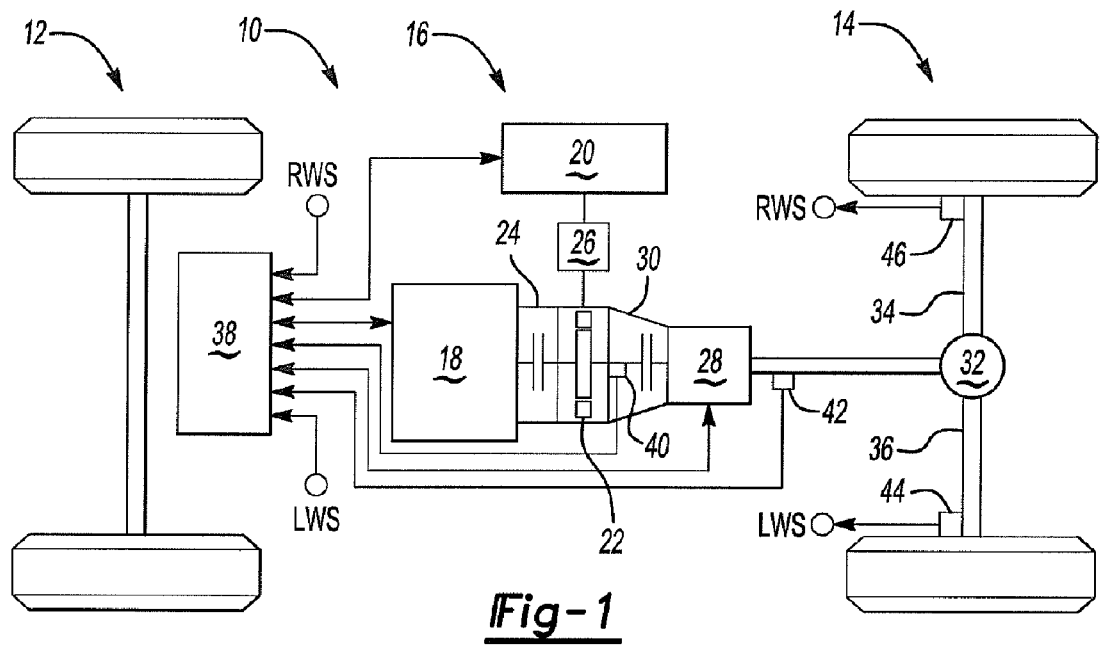
FIG. 1 shows a schematic of a hybrid electric vehicle.

Referring to FIG. 1, a schematic of a hybrid electric vehicle 10 is shown. The hybrid electric vehicle 10 includes a first wheel set 12, a second wheel set 14, and a drivetrain 16.

The wheel drive system or drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 may also include a plurality of power sources. In the embodiment shown in FIG. 1, the hybrid electric vehicle 10 includes a primary power source 18 and a secondary power source 20. However, any suitable number of power sources may be employed.

The primary power source 18 may be any suitable energy generation device, such as an internal combustion engine.

The secondary power source 20 may be any suitable voltage source, such as a battery, capacitor, or fuel cell. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art.

The primary and secondary power sources 18,20 are adapted to provide power to the drivetrain 16. The primary power source 18 is selectively coupled to an electrical machine, such as a motor, motor-generator, or starter-alternator 22, via a first clutch 24. If the first clutch 24 is engaged, the primary power source 18 may propel the hybrid electric vehicle 10. If the first clutch 24 is disengaged, the secondary power source 20 may power the starter-alternator 22 to propel the hybrid electric vehicle 10. In addition, both the primary and secondary power sources 18,20 may simultaneously provide power to the starter-alternator 22.

An inverter 26 may be disposed between the secondary power source 20 and the starter-alternator 22. The inverter 26 converts direct current (DC) to alternating current (AC) when current flows from the secondary power source 20 and converts alternating current (AC) to direct current (DC) when current flows to the secondary power source 20.

The starter-alternator 22 may be selectively coupled to a power transfer unit 28 via a second clutch 30. The power transfer unit 28 may be of any suitable type, such as a multi-gear "step ratio" transmission or an electronic converterless transmission as is known by those skilled in the art.

The power transfer unit 28 is adapted to drive one or more vehicle wheels. In the embodiment shown in FIG. 1, the power transfer unit 28 is connected to a differential 32 by a driveshaft. The differential 32 is connected to each wheel of the second wheel set 14 by a shaft 34,36, such as an axle or halfshaft.

Optionally, the hybrid electric vehicle 10 may be configured with one or more energy recovery devices, such as a regenerative braking system that captures kinetic energy when the brakes are applied and returns the recovered energy to the secondary power source 20 via the starter-alternator 22.

A vehicle system control module 38 may monitor and control various aspects of the hybrid electric vehicle 10. For example, the control module 38 may be connected to the primary power source 18, secondary power source 20, and power transfer unit 28 to monitor and control their operation and performance.

In addition, the control module 38 may receive input signals from various components. These components may include a plurality of speed sensors adapted to detect the rotational speed or rotational velocity of an associated component, such as a portion of a shaft. In the embodiment shown in FIG. 1, a first speed sensor 40 is disposed between the output of the starter-alternator 22 and the second clutch 30, a second speed sensor 42 is disposed between the output of the power transfer unit 28 and the differential 32, a third speed sensor 46 is disposed at an end of shaft 34 proximate the wheel, and a fourth speed sensor 48 is disposed at an end of shaft 36 proximate another wheel. In addition, a speed sensor may be incorporated with the primary power source 18 to detect the rotational speed or velocity of a primary power source output shaft.

As few as two speed sensors may be employed by the present invention. In a two sensor embodiment, one speed sensor may be disposed at or upstream from the driven end of shaft 34 or shaft 36 and another speed sensor would be disposed at or near the opposite end (or "wheel end") of the same shaft.

The speed sensors may have any suitable configuration and may be of any suitable type, such as a magnetic or optical encoder.

In a hybrid electric vehicle such as that previously described, it is desirable to predict torque disturbances in the wheel drive system and enable mitigation strategies to reduce the effects of such torque disturbances. A torque disturbance may take the form of gear backlash in one or more components of the wheel drive system, such as backlash between the gears of the power transfer unit and/or differential. Such gear backlash may be perceived by vehicle occupants as a loud noise, such as a bump or clunk. In addition, gear backlash may reduce component life and result in a delay or lag in vehicle acceleration.

A torque disturbance may occur when one or more adjoining gears experience torque in opposite directions, such as may occur when the hybrid electric vehicle accelerates or decelerates. For example, in a hybrid electric vehicle having an engine, the engine provides a compression braking effect when the vehicle decelerates. More particularly, when the first and second clutches are engaged, the compression braking effect provides negative torque to the power transfer unit. This negative torque is transmitted to the differential, halfshafts, and wheels. Alternatively, one or more shafts may experience negative torque during regenerative braking. The negative torque imparts a torsional or twisting force on one or more of the shafts that connect the drivetrain components. A portion of this torsional force may be stored as potential energy in one or more shafts. For example, the torsional force may twist each halfshaft, storing potential energy therein.

If the driver accelerates the vehicle, the engine torque switches from negative to positive (i.e., changes direction). The positive torque is transmitted from the engine to the power transfer unit, differential, halfshafts, and ultimately to the wheels. At some point during the transition from negative torque to positive torque, the driveline is in a relaxed state in which zero torque is applied to the wheels. During this zero torque condition, there is some play in the driveline since the gear teeth in the power transfer unit and/or differential are not tightly coupled to one or more mating gears. At or near the zero torque condition, the stored torsional energy in the halfshafts and/or other connecting shafts is released, thereby applying torque in the opposite (in this case negative) direction. The torque is transmitted to the gears, resulting in gear backlash, undesirable noise, and decreased wheel torque that is manifested as a decrease or hesitation in vehicle acceleration.

Figure 2:
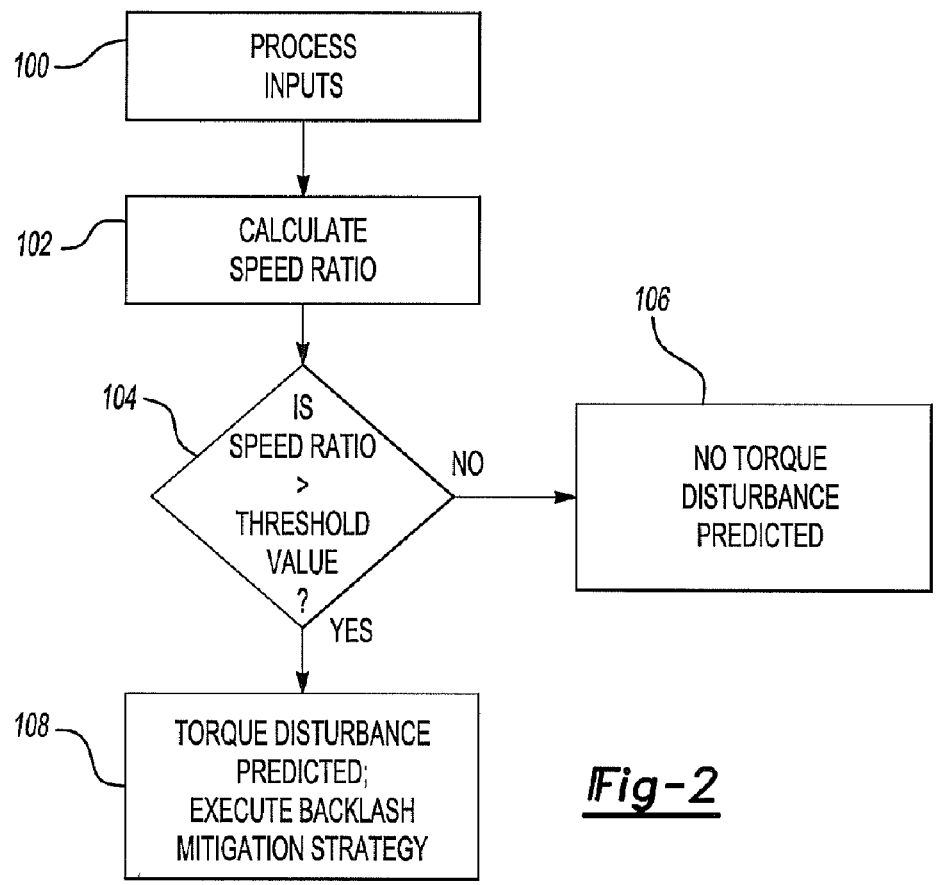
FIG. 2 is a flowchart of a method for detecting and mitigating torque disturbances in a wheel drive system of the hybrid electric vehicle.

Referring to FIG. 2, a flowchart of a method for detecting and mitigating torque disturbances in the wheel drive system of the hybrid electric vehicle 10 is shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by processing input signals from at least two speed sensors. This processing may include decoding and filtering the input signals to reduce noise or interference. In one exemplary embodiment discussed below, the input signals include signals from the third and fourth speed sensors 46,48 and a drivetrain output speed signal based on either the first speed sensor 40, the second speed sensor 42, or the speed sensor incorporated with the engine.

At 102, a speed ratio value is calculated. The speed ratio may be a ratio of the derivatives of the power transfer unit input speed or output speed to the average wheel speed. More particularly, the speed ratio may be a function of the following equation:

$$[DS(t)-DS(t-k)]^{\wedge}A+B]/[WS(t)-WS(t-k)]^{\wedge}A+B]$$

where:
A is an even integer,
B and k are constants,
DS(t) is a drivetrain output speed at time t,
DS(t-k) is the drivetrain output speed at time t-k,
WS(t) is an average wheel speed at time t, and
WS(t-k) is the average wheel speed at time t-k.

Constant A may be any even integer. An even integer, such as 2, may be used to square the differences in speed ratio equation to emphasize the point at which the drivetrain and wheel speeds begin to diverge and deemphasize the the regions where the drivetrain and wheel speeds change in proportion to one another.

Constant B may be any value. For example, an integer, such as 1, may be added to the numerator and denominator to prevent the ratio from going to infinity when the change in the wheel speed is zero.

Constant k may be any suitable value compatible with the performance attributes of the drivetrain and control unit. For example, a value between 10 to 100 milliseconds, such as 30 milliseconds, may be employed. Constant k may be determined by vehicle performance testing.

The drivetrain output speeds, DS(t) and DS(t-k), may be provided by the first speed sensor, second speed sensor, or speed sensor incorporated with the engine.

The average wheel speed at time t, denoted WS(t), is a function of the following expression:

$$[LWS(t)+RWS(t)]/2$$

where:
LWS(t) is a left wheel speed at time t, and
RWS(t) is a right wheel speed at time t.

The terms "left" and "right" are used for convenience in reference and are not intended to be limiting. The left wheel speed may be provided by speed sensor 44. The right wheel speed may be provided by speed sensor 46.

The average wheel speed at a prior time interval t-k, designated WS(t-k), is a function of the expression:

$$[LWS(t-k)+RWS(t-k)]/2$$

where:
LWS(t-k) is the left wheel speed at time t-k, and
RWS(t-k) is the right wheel speed at time t-k.

Figure 3:
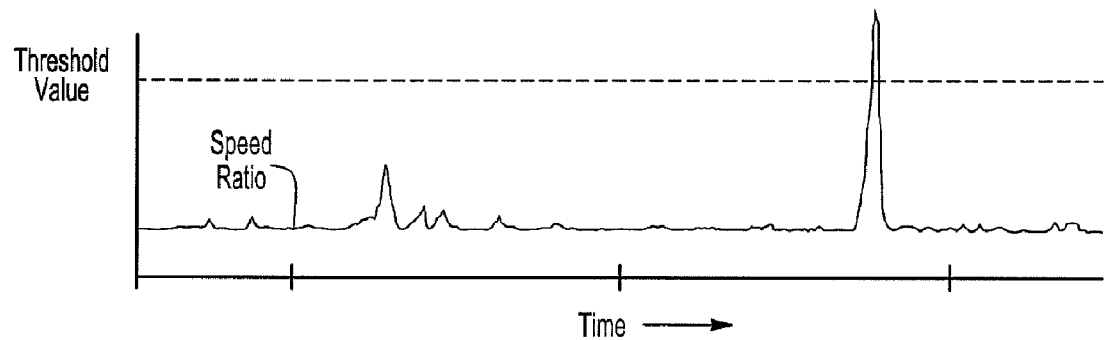
FIG. 3 is an plot depicting detection of a torque disturbance in accordance with the method of FIG. 2.

At 104, the speed ratio is compared to a threshold value. The threshold value may be determined by vehicle performance testing and may be calibrated to detect backlash events while ignoring or filtering out events caused by sensor abnormalities and/or electrically induced noise. The threshold value may be a constant selected to denote a significant degree of change in the calculated speed ratio. For example, the threshold value may be set to denote speed ratio increases at least 50% over a baseline or background speed ratio present during normal operating conditions. A graphical representation of an exemplary relationship between the speed ratio signal and threshold value is depicted in FIG. 3. If the speed ratio is less than or equal to the threshold value, the process continues at block 106. If the speed ratio is greater than the threshold value, the process continues at block 108.

At 106, no torque disturbance or gear backlash is predicted and the current iteration of the process ends.

At 108, the speed ratio is indicative of a torque disturbance. In response, a backlash mitigation strategy may be implemented. Backlash mitigation may be effected in various ways. For example, during a transition from vehicle acceleration to vehicle deceleration, the torque provided by the starter-alternator or engine may be increased or provided in the "positive" direction. Alternatively, the negative torque provided via the engine, starter-alternator, power transfer unit, and/or differential may be temporarily decreased to reduce the duration of a zero torque condition. Similarly, during a transition from vehicle deceleration to vehicle acceleration, the torque provided by the starter-alternator or engine may be reduced or provided in the opposite or "negative" direction. Alternatively, the positive torque provided via the engine, starter-alternator, power transfer unit, and/or differential may be temporarily ramped up to reduce the duration of a zero torque condition.

Figure 4:
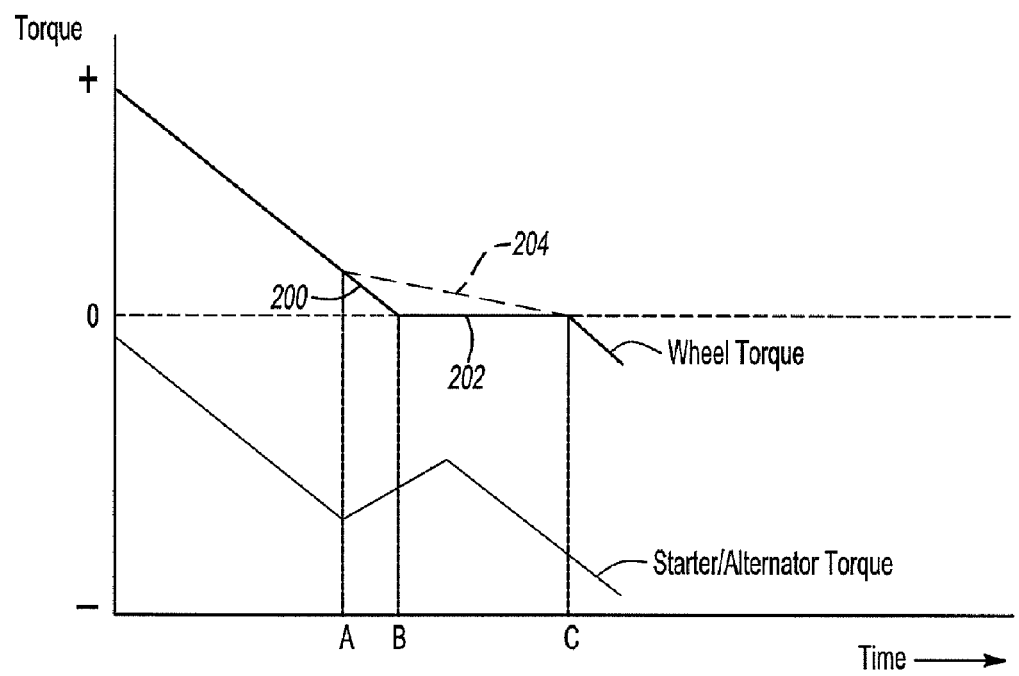
FIG. 4 is a plot depicting one embodiment of a torque disturbance mitigation strategy in accordance with the method of FIG. 2.

Referring to FIG. 4, a graphical representation of a ramping strategy using the starter-alternator is shown. In FIG. 4, wheel torque and starter-alternator torque are shown over time. In the absence of a backlash mitigation strategy, the wheel torque decreases from a positive (shown above the horizontal dotted line by line 200) to a zero torque condition (shown by line 202). More specifically, a zero torque condition exists between time B and time C. During this time period, the stored torsional energy in the halfshafts is rapidly released, resulting in an extended zero torque condition and gear backlash. After time C the stored torsional energy has been released and negative torque is detected.

A backlash mitigation strategy reduces the duration of a zero torque condition and inhibits gear backlash. Referring again to FIG. 4, a torque disturbance is detected at time A. More particularly, at time A the speed ratio exceeds the threshold value. Such a torque disturbance may be detected approximately 40 to 50 milliseconds before gear backlash might occur.

The mitigation strategy then increases the starter-alternator torque. The starter-alternator torque may be increased by a calculated amount or at a predetermined rate for a predetermined period of time. The increased starter-alternator torque is transmitted to the halfshafts to resist and slow the rate at which the potential energy is released. The result is shown graphically by line 204. More specifically, at time A the wheel torque decreases gradually along line 204 due to the additional torque provided by the starter-alternator. At time C, the zero torque condition is sufficiently short to result in a smooth transition from positive torque to negative torque in which mating gear teeth engage without backlash.

Alternatively, the backlash mitigation strategy may be configured such that the rate of change in the wheel torque remains constant immediately before and after a zero torque condition. More specifically, the wheel torque represented by line 204 may continue with the same slope after point C. As such, the wheel torque may ramp rapidly and smoothly between a positive and a negative torque condition.

In another embodiment, the backlash mitigation strategy may use calibrated offset points disposed before and after a zero torque condition. One offset point is disposed in the positive torque region. Another offset point is disposed in the negative torque region. The offset points designate inflection points at which the slope or rate of change of the wheel torque is modified. For example, the wheel torque may be ramped up to a first offset point disposed in the negative torque region at a first rate. Next, the wheel torque may be altered to follow a second trajectory or slope until the second offset point disposed in the positive torque region is reached. The wheel torque may be altered using one or more drivetrain components as previously discussed. Third, the wheel torque may be ramped up at a third rate after the third offset point is reached.

While the best mode for carrying out the invention has been described in detail, those familiar with the art to which this invention relates will recognize various alternative designs and embodiments for practicing the invention as defined by the following claims.

What is claimed is:

1. A method of operating a hybrid electric vehicle, the hybrid electric vehicle including a drivetrain adapted to transmit power from a power source to a vehicle wheel, the method comprising:

calculating a speed ratio value indicative of the release of potential energy stored in drivetrain component based on a drivetrain output speed and a wheel speed;

comparing the speed ratio value to a threshold value; and inferring a torque disturbance if the speed ratio value is greater than the threshold value.

2. The method of claim 1 further comprising executing a gear backlash mitigation strategy if the speed ratio value exceeds the threshold value.

3. The method of claim 1 wherein the hybrid electric vehicle further comprises a power transfer unit adapted to drive a vehicle wheel and having a plurality of gear ratios, a differential coupled to the power transfer unit and a shaft coupled to the vehicle wheel, wherein the speed ratio value is indicative of the release of potential energy stored in the shaft.

4. The method of claim 2 wherein the gear backlash mitigation strategy further comprises reversing a direction of torque associated with a power transfer unit adapted to drive a vehicle wheel for a predetermined period of time.

5. The method of claim 2 wherein the hybrid electric vehicle further comprises a starter-alternator adapted to receive power from the power source to apply torque to a power transfer unit, and the gear backlash mitigation strategy comprises applying additional torque with the starter-alternator for a predetermined period of time to reduce the duration of a zero-torque condition between gears of the power transfer unit.

6. The method of claim 2 wherein the hybrid electric vehicle further comprises a starter-alternator adapted to receive power from the power source and apply torque to a power transfer unit and a differential driven by the power transfer unit, and the gear backlash mitigation strategy comprises applying additional torque with the starter-alternator for a predetermined period of time to reduce the duration of a zero-torque condition between gears of the differential.

7. The method of claim 1 wherein the speed ratio value is determined as a function of the expression $$[DS(t)-DS(t-k)]^{A+B}/[WS(t)-WS(t-k)]^{A+B}$$

where:

A is an even integer,

B and k are constants,

DS(t) is a drivetrain output speed at time t,

DS(t-k) is the drivetrain output speed at time t-k,

WS(t) is an average wheel speed at time t, and

WS(t-k) is the average wheel speed at time t-k.

8. The method of claim 7 wherein the drivetrain output speed is measured at an output shaft of the a power transfer unit.

9. The method of claim 7 wherein the drivetrain output speed is measured at an output shaft of a starter-alternator.

10. The method of claim 7 wherein the drivetrain output speed is measured at an output shaft of the power source.

* * * * *